United States Patent
Büttiker et al.

(10) Patent No.: US 10,143,332 B2
(45) Date of Patent: Dec. 4, 2018

(54) BEVERAGE OUTLET FOR A BEVERAGE PREPARATION MACHINE

(71) Applicant: JURA ELEKTROAPPARATE AG, Niederbuchsiten (CH)

(72) Inventors: Philipp Büttiker, Oberbuchsiten (CH); Stephan Probst, Subingen (CH); Erich Ullmann, Egerkingen (CH)

(73) Assignee: Jura Elecktroapparate AG, Niederbuchsiten (CH)

( * ) Notice: Subject to any disclaimer, the term of this patent is extended or adjusted under 35 U.S.C. 154(b) by 212 days.

(21) Appl. No.: 14/991,369

(22) Filed: Jan. 8, 2016

(65) Prior Publication Data
US 2016/0198891 A1    Jul. 14, 2016

(30) Foreign Application Priority Data
Jan. 9, 2015   (EP) .................................... 15405001

(51) Int. Cl.
A47J 31/46    (2006.01)

(52) U.S. Cl.
CPC ............ *A47J 31/467* (2013.01); *A47J 31/46* (2013.01)

(58) Field of Classification Search
CPC ............................ A47J 31/467; A47J 31/4489
USPC ....... 99/323, 323.1, 293, 452, 453; 222/566, 222/3; 220/259.4
See application file for complete search history.

(56) References Cited

U.S. PATENT DOCUMENTS

| | | | | |
|---|---|---|---|---|
| 2,657,952 A | * | 11/1953 | Mendonca | B67D 1/1405 137/600 |
| 3,349,968 A | * | 10/1967 | Yuza | B67D 1/0044 222/132 |
| 4,219,134 A | * | 8/1980 | Wiesner | B67D 3/0012 222/129.3 |
| 4,509,690 A | * | 4/1985 | Austin | B01F 5/08 222/129.1 |

(Continued)

FOREIGN PATENT DOCUMENTS

| DE | 2733487 A1 | 2/1979 |
|---|---|---|
| DE | 20 2008 008257 U1 | 10/2009 |

(Continued)

OTHER PUBLICATIONS

Extended European Search Report from corresponding European Patent Application No. 15405001.7 dated Jul. 3, 2015.

*Primary Examiner* — Jimmy Chou
(74) *Attorney, Agent, or Firm* — Alston & Bird LLP

(57) ABSTRACT

A beverage outlet for a beverage preparation machine, for example for a coffee maker, may include an outlet tube, one end of which can be connected to the beverage preparation machine and the other end of which may have an outlet opening for dispensing a beverage from the beverage preparation machine. The beverage outlet furthermore may have a beverage guide element, which runs coaxially to the outlet tube and a first section of which is arranged inside the outlet tube and a second section of which projects out of the outlet opening of the outlet tube. Provision is made for the outlet tube to have at least one notch, which extends frontally from the outlet opening-side end of the outlet tube opposite to the beverage dispensing direction (D) and which forms a passage opening between inner and outer area of the outlet tube.

14 Claims, 5 Drawing Sheets

(56) References Cited

U.S. PATENT DOCUMENTS

| | | | | |
|---|---|---|---|---|
| 4,735,133 A * | 4/1988 | Paoletti | ............... | A47J 31/4489 239/427.3 |
| 4,949,631 A * | 8/1990 | Fregnan | ............... | A47J 31/4485 261/DIG. 26 |
| D341,418 S * | 11/1993 | Akimoto | ....................... | D23/213 |
| 5,335,588 A * | 8/1994 | Mahlich | ............... | A47J 31/4489 261/121.1 |
| 5,423,245 A * | 6/1995 | Midden | ............... | A47J 31/4485 239/445 |
| 5,464,574 A * | 11/1995 | Mahlich | ............... | A47J 31/4489 261/124 |
| 5,768,975 A * | 6/1998 | Wu | ...................... | A47J 31/4489 99/290 |
| 5,768,981 A * | 6/1998 | Cicchetti | ............. | A47J 31/4485 99/275 |
| 5,769,135 A * | 6/1998 | Mahlich | ............... | A47J 31/4489 141/70 |
| 5,855,162 A * | 1/1999 | Bauer | ................. | A47J 31/4485 222/566 |
| 6,644,177 B1 * | 11/2003 | Hsu | ..................... | A47J 31/4489 99/287 |
| 6,786,138 B2 * | 9/2004 | Johnson | ............... | A47J 31/4489 141/82 |
| 6,857,355 B2 * | 2/2005 | Rolland | ............... | A47J 31/0621 99/302 R |
| 7,607,549 B2 * | 10/2009 | Morini | ............... | B65D 41/3438 206/219 |
| 7,651,003 B2 * | 1/2010 | Albers | ................. | B65D 47/263 215/251 |
| 7,810,426 B2 * | 10/2010 | Balkau | ................. | A47J 31/4489 141/70 |
| 8,935,978 B2 * | 1/2015 | Balestier | ............. | A47J 31/4489 99/293 |
| 9,694,954 B2 * | 7/2017 | Lank | ..................... | B65D 47/32 |
| 2002/0074365 A1 * | 6/2002 | Young | .................. | B65D 47/243 222/484 |
| 2003/0168474 A1 * | 9/2003 | Widgery | ............ | A47G 19/2266 222/183 |
| 2004/0231528 A1 * | 11/2004 | Paoletti | ............... | A47J 31/4489 99/452 |
| 2004/0262337 A1 * | 12/2004 | Young | ................. | B65D 47/0838 222/484 |
| 2010/0154648 A1 * | 6/2010 | Angeletti | ............ | A47J 31/4489 99/293 |
| 2011/0220687 A1 * | 9/2011 | Schneider | ......... | B05C 17/00513 222/566 |
| 2011/0297007 A1 * | 12/2011 | Balestier | ............. | A47J 31/4485 99/323.1 |
| 2011/0303698 A1 * | 12/2011 | Tauber | ................. | B65D 47/122 222/111 |
| 2012/0074143 A1 * | 3/2012 | Lin | ......................... | A47J 31/18 220/259.4 |
| 2012/0104038 A1 * | 5/2012 | Quaratesi | ............ | A47J 31/4489 99/277.2 |
| 2013/0233869 A1 * | 9/2013 | Tamarit Rios | ..... | B65D 47/0804 220/715 |
| 2014/0090565 A1 * | 4/2014 | Yang | ................... | A47J 31/0663 99/323 |
| 2014/0137749 A1 | 5/2014 | Marchi et al. | | |
| 2014/0322412 A1 * | 10/2014 | Buchholz | ................. | A01J 11/04 426/474 |
| 2014/0322415 A1 * | 10/2014 | Buchholz | ................. | A01J 11/04 426/519 |
| 2015/0223634 A1 * | 8/2015 | Mosconi | ............. | A47J 31/4489 99/293 |

FOREIGN PATENT DOCUMENTS

| | | |
|---|---|---|
| EP | 2 138 077 A2 | 12/2009 |
| JP | 2008-212180 A | 9/2008 |
| JP | 2010 231585 A | 10/2010 |

\* cited by examiner

BEVERAGE OUTLET FOR A BEVERAGE PREPARATION MACHINE

CROSS-REFERENCE TO RELATED APPLICATIONS

This application claims priority to European Patent Application No. 15405001.7, filed Jan. 9, 2015, which application is hereby incorporated by reference in its entirety.

FIELD OF THE INVENTION

The invention relates to a beverage outlet for a beverage preparation machine, for example for a coffee maker, comprising an outlet tube, one end of which can be connected to the beverage preparation machine and the other end of which has an outlet opening for dispensing a beverage from the beverage preparation machine, as well as comprising a beverage guide element, which runs coaxially to the outlet tube and a first section of which is arranged inside the outlet tube and a second section of which projects out of the outlet opening of the outlet tube. The invention furthermore relates to a beverage preparation machine comprising such a beverage outlet.

BACKGROUND

Beverage outlets are known from the prior art and are used, for instance, in coffee makers, in particular in fully automatic coffee makers, or the like. The central beverage guide element, which is arranged coaxially to the outlet tube and which partially projects out of the latter, thereby serves to calm the beverage flow, which escapes from the outlet opening, for instance the coffee stream. It is also known that a relatively large inner diameter of the outlet tube, for instance of more than 6 mm, can also contribute to calm the escaping beverage stream.

Beverage guide elements, which, for example, have four wings in the shape of a cross or star, which extend radially outwards relative to the longitudinal direction of the beverage guide element, are thus known from the prior art from time to time. The first section of the beverage guide element, which is arranged inside the outlet tube, can have a length of 3.5 mm, for instance, while the second section typically projects only a few millimeters, maximally 3 mm, out of the outlet opening of the outlet tube. In addition, provision can be made for the wing cross to be embodied in the shape of a pyramid in outlet direction. The pyramid tip in the center of the escaping beverage stream thereby serves as drip edge or drip tip, respectively.

However, it turned out that the escaping beverage stream is oftentimes still too turbulent from time to time in spite of the presence of beverage guide elements. In the case of coffee makers, in particular in the case of fully automatic coffee makers, contaminations occur in many cases on the machine front, the cup tray and the tray base, which are caused by splashes of the coffee stream, which escapes from the coffee outlet. These splashes furthermore lead to undesired, brown scatter stains on the surface of the white milk froth, for instance when obtaining a cappuccino. Such splash effects, however, do not only occur in the case of coffee outlets of coffee makers, but for instance also in the case of outlets of milk frothers on coffee makers or in the case of other beverage preparation machines, for instance in the case of tee preparation machines or beverage preparation machines, which allow to obtain different beverages and liquids, for example soups, tees, coffees, etc.

SUMMARY OF VARIOUS EMBODIMENTS

It is thus the object of the invention to specify a beverage outlet for a beverage preparation machine of any type, but in particular for coffee makers, as well as a beverage preparation machine, in particular a coffee maker, in the case of which the beverage stream escapes from the outlet opening in a significantly calmer manner and in the case of which the afore-described splash effects are furthermore avoided or are at least minimized.

This object is solved by means of a beverage outlet as well as a beverage preparation machine, embodiments of which are detailed herein. Further advantageous embodiments of the invention are detailed herein.

It has been recognized in a manner according to the invention that the unrest and the splashes of the escaping beverage stream are caused by trapped air in the beverage stream. In the case of a coffee maker, for instance, for example in the case of a fully automatic coffee maker, comprising a closed fluid system, that is, in the case of a coffee maker, which does not have pressure compensating openings or other pressure compensating options, from the brewing unit to the coffee outlet, air is trapped in the fluid path after obtaining coffee as a result of the opening and closing of the brewing unit. The next time coffee is obtained, this trapped air moves with the prepared beverage in the direction of the beverage outlet. On the way there, the trapped air expands further as a function of the cross section of the fluid path and can then lead to the formation of beverage air bubbles in the area of the outlet opening, which then typically burst in response to and shortly after escaping the beverage outlet, which leads to the undesired splash effects and to the unrest moments in the escaping beverage stream.

To counteract this, the invention makes provision in the case of the afore-described beverage outlets for the outlet tube to have three or more notches, each of which extends frontally from the outlet opening-side end of the outlet tube opposite to the beverage dispensing direction and forms a passage opening between the inner and the outer area of the outlet tube. In addition, the beverage guide element has three or more wings, each of which extends from a central axis of the outlet tube radially to the outside at least in the area of the second section of the beverage guide element, wherein the wings are distributed evenly with regard to the circumference of the outlet tube, and wherein the number of wings corresponds to the number of notches on the outlet tube and the notches are distributed across the circumference of the outlet tube so that one notch is assigned in each case to each segment space between two adjacent wings.

As a result, it is attained that the air, which is trapped in the fluid path, can escape from the outlet tube very quickly to the side through the at least one notch, before larger beverage air bubbles, which could then burst subsequently, are created at the outlet opening.

According to one embodiment of the invention, each of the three or more notches can have a semicircular, rectangular, square, triangular or trapezoidal contour or shape, respectively (in each case viewed in a direction, which extends radially to the longitudinal axis or central axis, respectively, of the outlet tube through the corresponding notch). These shapes can be embodied as frontal notches in the outlet tube in a particularly simple manner and ensure a sufficient lateral air discharge.

Provision can thus be made, for example, for the width of each notch in circumferential direction of the outlet tube and the depth of the notch in longitudinal direction of the outlet tube to be approximately 1.5 mm in the case of a rectangular notch.

In the case of a particularly preferred embodiment of the invention, provision is made for the each notch on the outlet opening-side end of the outlet tube to have a width in circumferential direction of the outlet tube, which is larger than or equal to the depth of the notch in longitudinal direction of the outlet tube. It turned out that the formation of bubbles at the outlet opening can be avoided through this in a particularly effective manner.

The three or more notches increase the lateral air discharge capability. Preferably, the notches are distributed evenly across the circumference of the outlet tube.

To destroy bubbles, which are created in the outlet tube in spite of frontal notches, in the formation phase prior to becoming larger, provision can be made in the case of a further advantageous embodiment of the invention for the outlet opening-side end of the outlet tube to have an acute-angled or rectangular edge towards the central axis of the outlet tube. Because it is sharp-edged, such an acute-angled or rectangular edge has the effect that bubbles, which are created, are cut directly at the outlet opening, so that only minimal splash effects occur, if applicable, because, due to the notch, such residual bubbles are only very small—if anything.

In addition, provision can be made for the inner diameter of the outlet tube to be reduced as compared to the outlet tubes, which are known from the prior art, so that bubbles, which might possibly be created in spite of the notches according to the invention, remain as small as possible. Advantageously, the inner diameter of the outlet tube is thus smaller than 5 mm, preferably smaller than or equal to 4.6 mm.

In addition to the notches, the beverage guide element provided according to the invention, in particular the second section of the beverage guide element, which projects out of the outlet opening in beverage dispensing direction, has the effect that, on the one hand, the beverage stream, which escapes from the outlet opening, is guided and calmed. On the other hand, the second section, which projects out below the outlet opening-side end of the outlet tube, has the effect that possible small residual bubbles are carried away with the beverage stream and thus possibly burst only later, for instance in a mug, glass, cup or the like, located underneath the beverage outlet.

To optimally utilize this advantageous effect of the second projecting section of the beverage guide element, provision can be made in an advantageous embodiment of the invention for the second section of the beverage guide element to project at least 4 mm, preferably at least 6 mm, from the outlet opening of the outlet tube.

According to a further advantageous embodiment of the invention, a beverage guide element, which is designed in a particularly simple manner, yet which acts in a highly effective manner, is embodied as cylinder comprising a round, square or evenly polyhedral cross section, at least area by area, in particular in the first and/or in the second section of the beverage guide element.

The beverage guide element has three or more wings, each wing extending from the central axis of the outlet tube radially to the outside, at least in the area of the second section. Each wing supports the guiding and calming of the beverage stream, which escapes form the outlet opening, in an advantageous manner. This effect is increased in an advantageous manner, when each wing extends in longitudinal direction of the beverage guide element across the entire length of the second section and/or also extends across the first section of the beverage guide element at least area by area.

With the same goal as well as to support the wings against the outlet tube, provision can be made for the three or more wings to extend radially to the outlet opening-side end of the outlet tube and/or to the inside of the outlet tube, in particular to be connected to the outlet opening-side end and/or to the inside of the outlet tube.

According to a further advantageous embodiment of the invention, each of the three or more wings can furthermore have a wing edge, which points in beverage dispensing direction and which is inclined in beverage dispensing direction towards the central axis of the outlet tube at an angle of less than 90°, in particular of larger than 45°, preferably of below 60°. As a result, it is attained that the escaping beverage stream is guided towards the central axis of the outlet tube and is thus concentrated on the central axis of the outlet tube and is centered relative to the central axis of the outlet tube. The latter leads to a particularly strongly pronounced centering of a beverage stream, which escapes from the outlet opening, relative to the central axis of the outlet tube. In addition, possible remainders of beverages, which trickle out of the outlet after the beverage is dispensed, can drain centrally in the area of the central axis of the outlet tube due to the inclined wing edge.

In an advantageous manner, the beverage guide element has a plurality of, in particular three, four, five, six or seven, preferably three wings, which are distributed evenly in particular with regard to the circumference of the outlet tube.

To optimally utilize the advantageous effect of the notches in the outlet tube with the effect of the wings, provision is made for the number of the wings to correspond to the number of the notches on the outlet tube, wherein one notch is preferably assigned in each case to each segment space between two adjacent wings.

Preferably, the beverage guide element is embodied in one piece with the three or more wings.

The instant invention furthermore relates to a beverage preparation machine, for example a coffee maker, in particular a fully automatic coffee machine, comprising a beverage outlet according to the invention, as described above.

BRIEF DESCRIPTION OF THE SEVERAL VIEWS OF THE DRAWINGS

Further goals, advantages and possible uses of the instant invention follow from the description below of an exemplary embodiment by means of the drawings.

DETAILED DESCRIPTION

Figure 1:
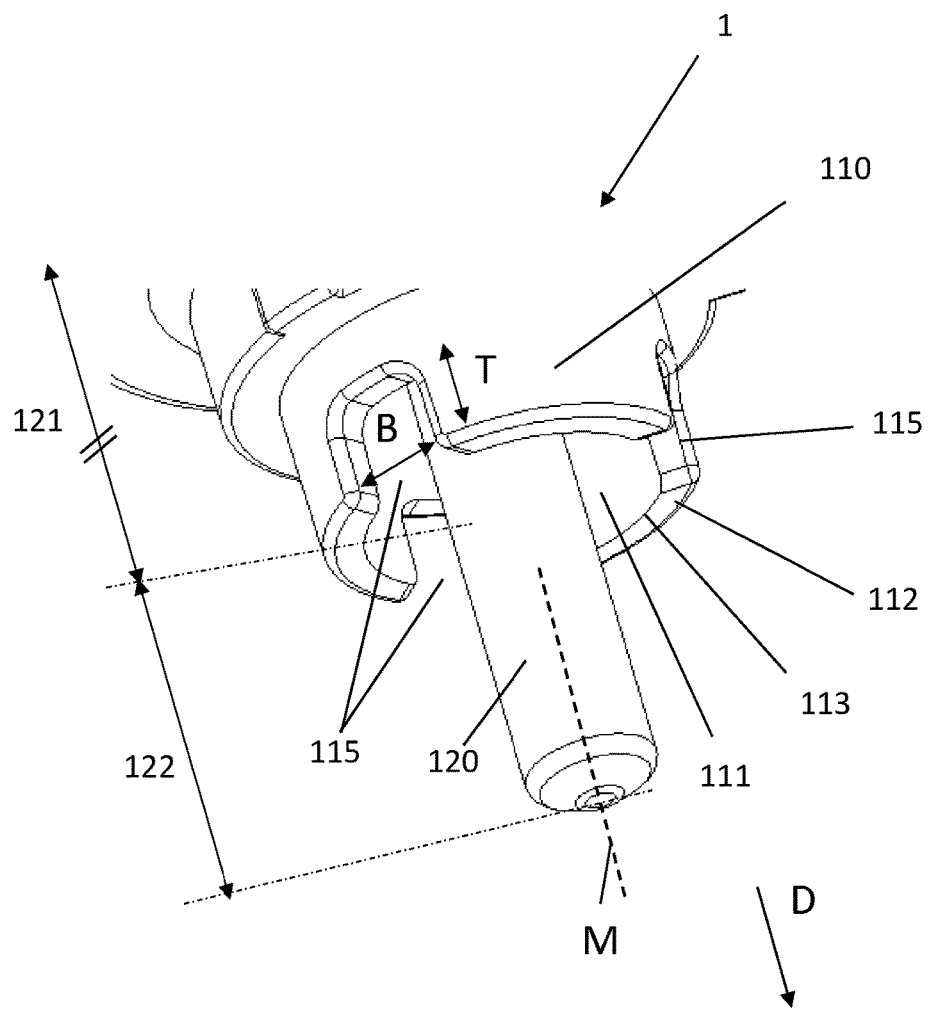
FIG. 1 shows an advantageous embodiment of the beverage outlet according to the invention in a perspective view.

FIGS. 1 to 5 show two advantageous embodiments of a beverage outlet 1 according to the invention, which differ mainly in the concrete embodiment of the beverage guide element.

In the case of both embodiments of the beverage outlet 1 shown in FIGS. 1 and 2 or FIGS. 3-5, respectively, said beverage outlet has an outlet tube 110, 210, one end of which is connected to a beverage preparation machine 2, in the case at hand a fully automatic coffee maker, for example, and the other end 112, 212 of which has an outlet opening 111, 211 for dispensing a beverage, in the case at hand a coffee beverage. For this purpose, the beverage outlet is flow-connected to a brewing group of the fully automatic coffee maker, which is not illustrated in the figures, via a fluid path.

In the case of both embodiments according to FIGS. 1 and 2 or FIGS. 3-5, respectively, shown in the case at hand, the beverage outlet 1 in each case has a beverage guide element 120, 220, which runs coaxially to the outlet tube 110, 210, and a first section 121, 221 of which is arranged inside the outlet tube 110, 210 and a second section 122, 222 of which projects out of the outlet opening 111, 211 of the outlet tube 110, 210, wherein the beverage, which is to be dispensed, escapes from the room area between the inner wall of the outlet tube 110, 210 and the beverage guide element 120, 220 at the outlet opening 111, 211.

The beverage guide element 120, 220, in particular the second section 122, 222, which projects out of the outlet opening in beverage dispensing direction D, has the effect that the beverage stream, which escapes from the outlet opening 111, 211, is guided and calmed. In addition, the second section 122, 222, which projects out below the outlet opening-side end 112, 212 of the outlet tube 110, 210, has the effect that small bubbles, which might be present, are carried away with the beverage stream prior to bursting and thus possibly burst only later, for instance in a mug, glass or cup, located underneath the beverage outlet 1. Preferably, the second section 122, 222 of the beverage guide element 120, 220 projects at least 4 mm, in the case at hand approximately 6 mm, from the outlet opening 111, 211 of the outlet tube 110, 210 for this purpose.

To already suppress the creation of bubbles, the outlet tube 110, 210 according to the invention has three or more notches 115, 215, each of which extends frontally from the outlet opening-side end 112, 212 opposite to the beverage dispensing direction D and which forms a passage opening between inner and outer area of the outlet tube 110, 210. As a result, it is attained that the air, which is trapped in the fluid path, can escape from the outlet tube 110, 210 very quickly to the side through the notches 115, 215, before larger beverage air bubbles, which could then burst subsequently (that is, downstream from the outlet opening-side end 112, 212 of the outlet tube 110, 210 with regard to the beverage dispensing direction D), are created at the outlet opening 111, 211.

In the two alternative embodiments of the beverage outlet 1 according to FIGS. 1 and 2 or FIGS. 3-5, respectively, shown in the case at hand, provision is in each case made for a total of three rectangular notches 115, 215, which are distributed evenly across the circumference of the outlet tube 110, 210. In this context, the afore-mentioned term "rectangular" refers to the shape of the contour of the respective notch 115 or 215, respectively, viewed in a direction, which extends radially to the central axis M of the outlet tube 110, 210 through the respective notch 115 or 215, respectively. As an the alternative, however, the respective notch 115 or 215, respectively, could also have a semicircular, square, triangular or trapezoidal shape or a different shape, which differs from the afore-mentioned shapes.

In particular, the width B of each notch 115, 215 in circumferential direction of the outlet tube 110, 210 is equal to the depth T of the notch 115, 215 in longitudinal direction of the outlet tube 110, 210. In the case at hand, the depth T and the width B is 1.5 mm in each case. However, it is preferred to select the width B of each notch 115, 215 to be larger than the depth T. This is so, because it turned out that this specific embodiment of the notches 115, 215 is particularly well suited to ensure a sufficiently effective lateral air discharge from the outlet tube 110, 210.

In addition, the outlet opening-side end 112, 212 in both embodiments of the outlet tube 110, 210 has a rectangular and thus sharp edge 113, 213 towards the central axis M of the outlet tube 110, 210, which has the effect that bubbles, which are nonetheless created in spite of notches 115, 215, are cut directly at the outlet opening 111, 211, so that only minimal splash effects occur, if applicable.

In addition, provision can be made for the inner diameter of the outlet tube 110, 210 to be chosen as small as possible, so that bubbles, which might possibly be created in spite of the notches according to the invention, remain as small as possible. The inner diameter of the outlet tube 110, 210 in the case of the two exemplary embodiments at hand is thus 4.6 mm.

Figure 2:
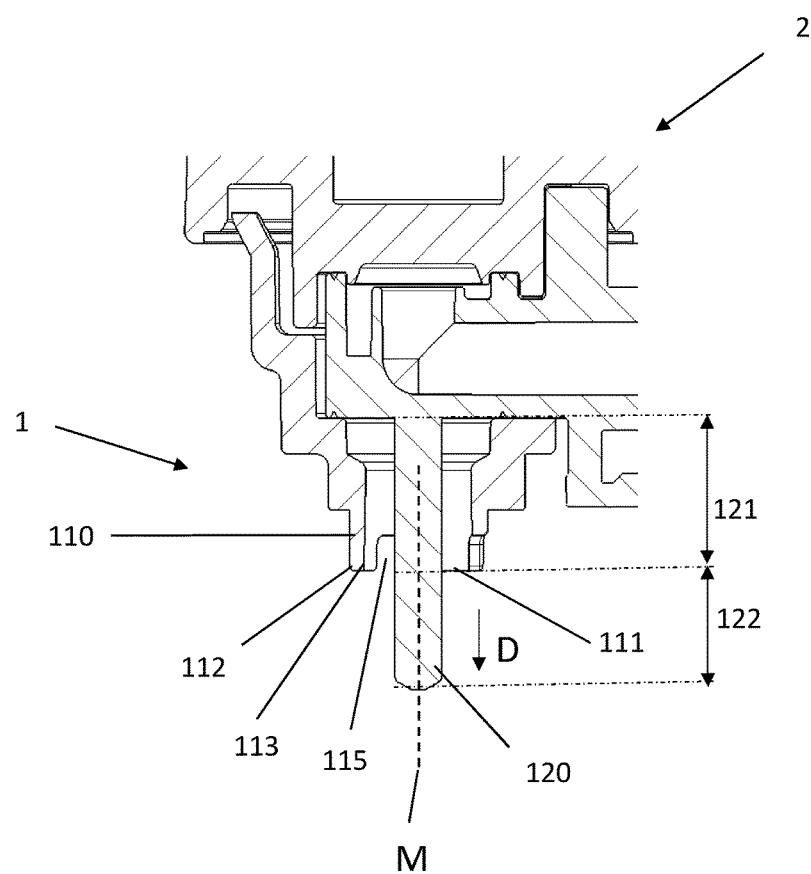
FIG. 2 shows a beverage outlet according to FIG. 1 in sectional illustration.

In the case of the embodiment according to FIGS. 1 and 2, the beverage guide element 120 is embodied as cylinder comprising a round cross section in the first as well as in the second section 121, 122. This represents a particularly simple and cost-efficient, yet a sufficiently effective embodiment of the beverage guide element 120, so to speak.

As can in particular be seen in FIG. 2, the end of the beverage guide element 120, which is located in dispensing direction D, tapers in an apex-shaped or truncated cone-shaped manner or is rounded, respectively. It is attained through this that trickling beverage residues can drain centrally in the area of the central axis M of the outlet tube 110.

Figure 3:
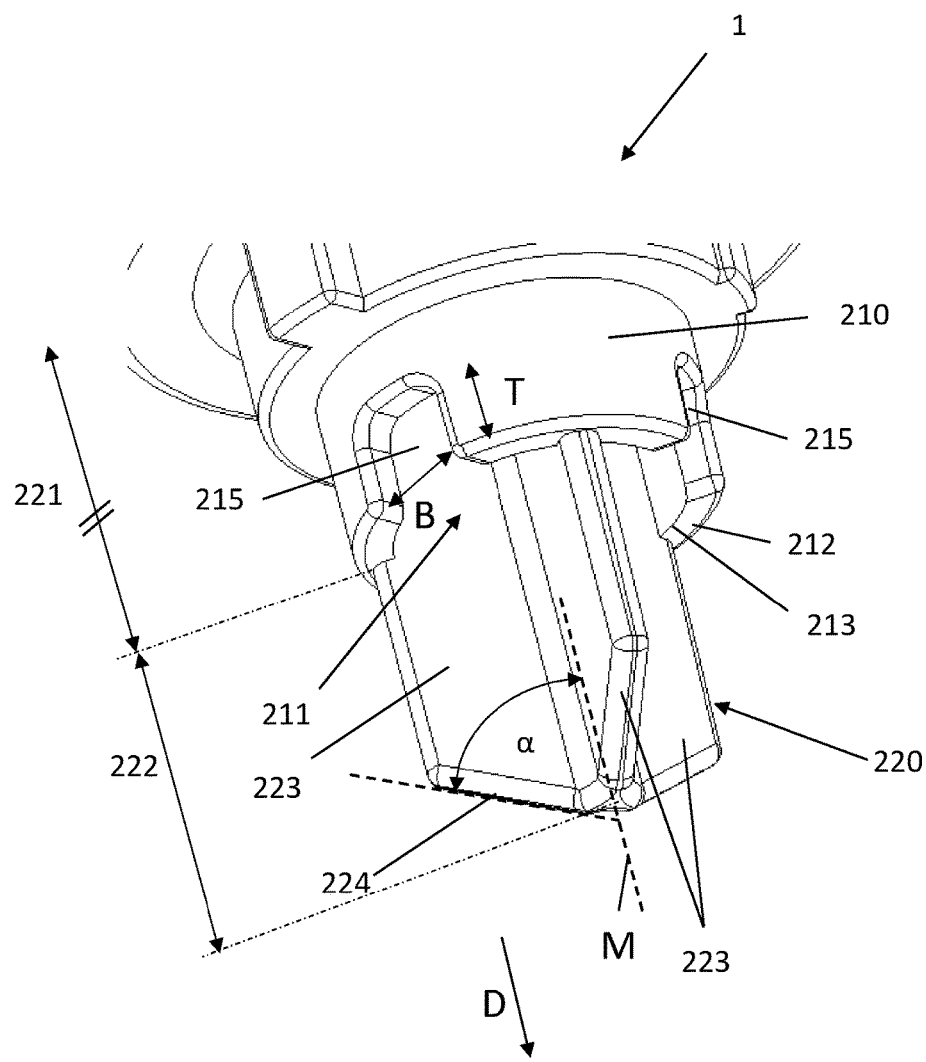
FIG. 3 shows a further advantageous embodiment of the beverage outlet according to the invention in a perspective view.
Figure 4:
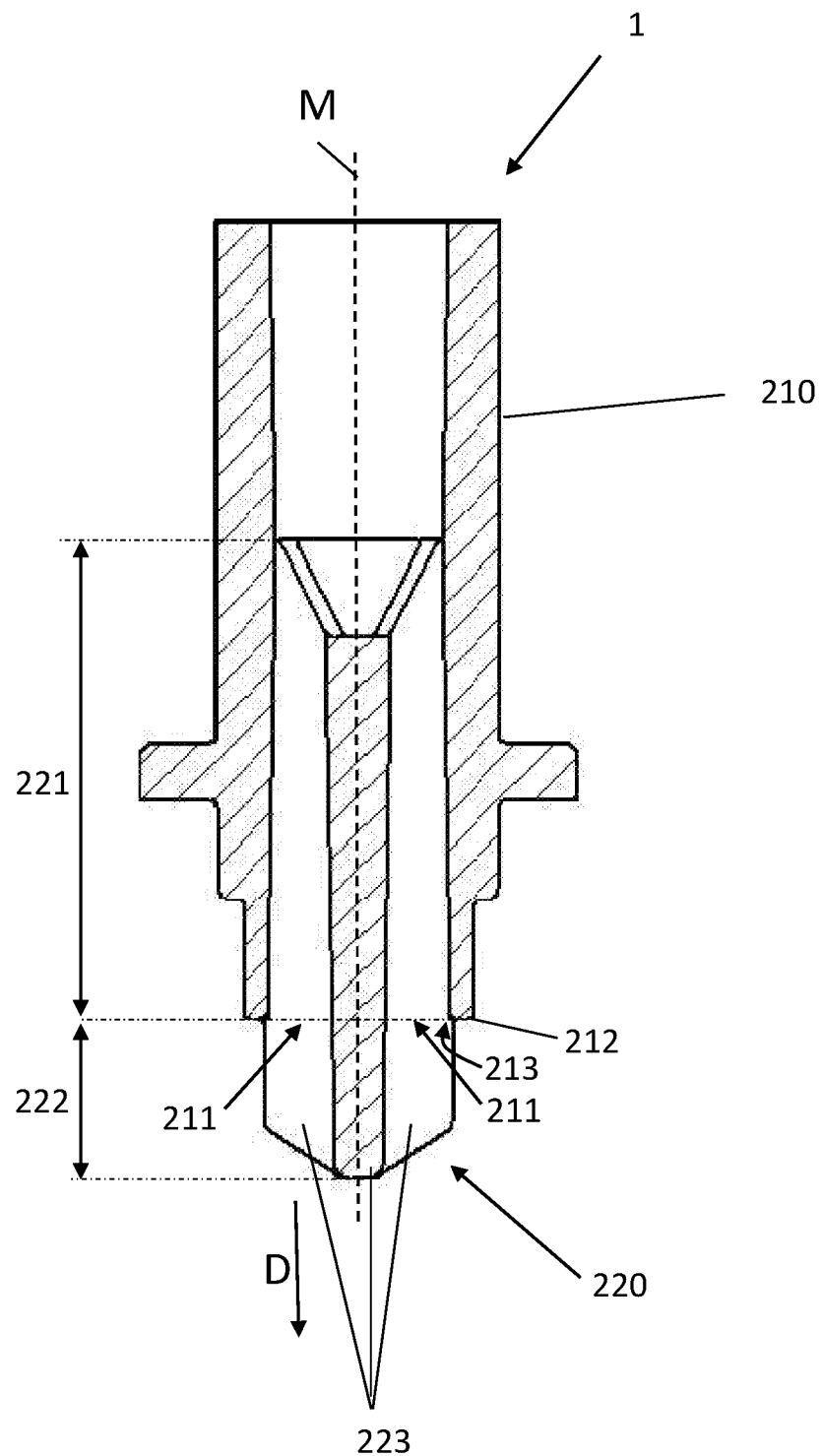
FIG. 4 shows a beverage outlet according to FIG. 3 in a longitudinal section along a central axis of the outlet tube.
Figure 5:
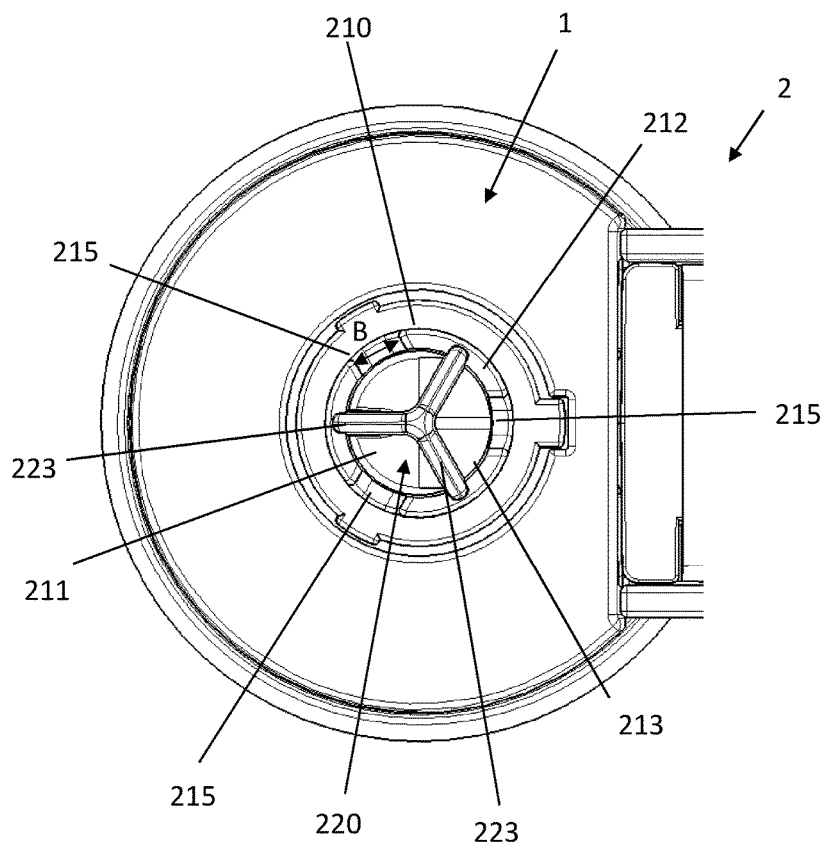
FIG. 5 shows a beverage outlet according to FIG. 3 in a view from below.

In the case of the second embodiment of the invention according to FIGS. 3-5, the beverage guide element 220 has a total of three wings 223, which extend radially outwards from the central axis M of the outlet tube 210. The wings 223 extend in longitudinal direction of the beverage guide element 220 across the entire length of the second section 222 and also across the first section 221 of the beverage guide element 220 at least area by area.

The wings 223 further extend radially to the outlet opening-side end 212 of the outlet tube 210 or to the inside of the outlet tube 210, respectively. In particular, the wings 223 in the exemplary embodiment shown in the case at hand are connected to the outlet opening-side end 212 and to the inside of the outlet tube 210. As a whole, the beverage guide element 220 comprising the wings 223 is embodied in one piece in terms of a simple and cost-efficient production.

In addition, the three wings 223 in each case have a wing edge 224, which points in beverage dispensing direction D and which is inclined at an angle $\alpha$ of 60° in beverage dispensing direction D towards the central axis M of the outlet tube 210. As a result, the three-winged, star-like beverage guide element 220 has a pyramid-shaped end section, which points in beverage dispensing direction D and which makes it possible for beverage residues, which trickle, to drain centrally in the area of the central axis M of the outlet tube 110.

The invention claimed is:

1. A beverage outlet for a beverage preparation machine comprising an outlet tube, one end of which is configured to be connected to the beverage preparation machine and an other end of which has an outlet opening for dispensing a beverage from the beverage preparation machine, as well as comprising a beverage guide element, which runs coaxially to the outlet tube and a first section of which is arranged inside the outlet tube and a second section of which projects out of the outlet opening of the outlet tube,
    wherein the outlet tube has three or more notches, each of which extends frontally from an outlet opening-side end of the outlet tube opposite to a beverage dispensing direction (D) and forms a passage opening between an inner area of the outlet tube and an outer area of the outlet tube,
    wherein the beverage guide element has three or more wings, each of which extends from a central axis (M) of the outlet tube radially to the outside at least in an area of the second section of the beverage guide element,
    wherein the three or more wings are distributed evenly with regard to a circumference of the outlet tube, and
    wherein a number of the three or more wings corresponds to a number of the three or more notches on the outlet tube and the notches are distributed across the circumference of the outlet tube so that one notch is assigned in each case to each segment space between two adjacent wings.

2. The beverage outlet according to claim 1, wherein each notch has a semicircular, rectangular, square, triangular or trapezoidal shape.

3. The beverage outlet according to claim 1, wherein on the outlet opening-side end of the outlet tube, each notch has a width (B) in circumferential direction of the outlet tube, which is larger than or equal to a depth (T) of the each notch in longitudinal direction of the outlet tube.

4. The beverage outlet according to claim 1, wherein the outlet opening-side end of the outlet tube has an acute-angled or rectangular edge towards the central axis (M) of the outlet tube.

5. The beverage outlet according to claim 1, wherein the beverage guide element is embodied as cylinder comprising a round, square or evenly polyhedral cross section, at least area by area, in the first section of the beverage guide element and/or in the second section of the beverage guide element.

6. The beverage outlet according to claim 1, wherein each wing extends in longitudinal direction of the beverage guide element across an entire length of the second section of the beverage guide element and/or also extends across the first section of the beverage guide element at least area by area.

7. The beverage outlet according to claim 1, wherein each wing extends radially to the outlet opening-side end of the outlet tube and/or to an inside of the outlet tube, in particular is connected to the outlet opening-side end and/or to the inside of the outlet tube.

8. The beverage outlet according to claim 1, wherein each wing has a wing edge, which points in the beverage dispensing direction (D) and which is inclined in the beverage dispensing direction (D) towards the central axis (M) of the outlet tube at an angle ($\alpha$) of less than 90°.

9. The beverage outlet according to claim 1, wherein the beverage guide element is embodied in one piece with the at least one wing.

10. The beverage outlet according to claim 1, wherein the second section of the beverage guide element projects at least 4 mm from the outlet opening of the outlet tube in the beverage dispensing direction (D).

11. A beverage preparation machine comprising the beverage outlet according to claim 1.

12. The beverage outlet according to claim 1, wherein the three ore more notches are distributed evenly across the circumference of the outlet tube.

13. The beverage outlet according to claim 8, wherein the angle ($\alpha$) is larger than 45° and less than 60°.

14. The beverage outlet according to claim 10, wherein the second section of the beverage guide element projects at least 6 mm from the outlet opening.

* * * * *

UNITED STATES PATENT AND TRADEMARK OFFICE
CERTIFICATE OF CORRECTION

PATENT NO. : 10,143,332 B2
APPLICATION NO. : 14/991369
DATED : December 4, 2018
INVENTOR(S) : Büttiker et al.

It is certified that error appears in the above-identified patent and that said Letters Patent is hereby corrected as shown below:

On the Title Page

Item (73) Assignee: "Jura Elecktroapparate AG" should read --Jura Elektroapparate AG--.

Signed and Sealed this
Second Day of July, 2019

Andrei Iancu
*Director of the United States Patent and Trademark Office*